June 20, 1939.  J. V. O. PALM  2,163,152

CLUTCH

Filed Feb. 18, 1937

INVENTOR.
John V. O. Palm
BY Ray, Oberlin Ray
ATTORNEYS.

Patented June 20, 1939

2,163,152

UNITED STATES PATENT OFFICE 2,163,152

CLUTCH

John V. O. Palm, Cleveland Heights, Ohio, assignor to The Cleveland Graphite Bronze Company, Cleveland, Ohio, a corporation of Ohio Application February 18, 1937, Serial No. 126,365

2 Claims. (Cl. 192—68)

The present invention, relating as indicated to improvements in clutches, is particularly directed to the provision of a clutch of simple design, few parts, light weight, and hence low spinning inertia of those parts which continue rotating temporarily upon disengagement. One of the principal objects of the invention is the provision of a clutch for use in motor driven vehicles which will be inexpensive and simple and in which the driven element of the clutch combination will be of such light weight that it will cease rotation rapidly after disengagement of the parts. A further object of the invention is the provision in such a mechanism of a construction which will permit cooling of those parts of this type of clutch which in the past have become unduly heated.

A very common type of clutch used in automotive vehicles consists of two spaced relatively longitudinally displaceable members, which are the driving elements of the combination, and an intermediate driven member which is engaged between the two first-named members to transfer a drive from the first-named members to the second. This type of clutch is ordinarily made to run dry, that is, it is not enclosed in a chamber containing liquid, such as oil, and for convenience and low cost one of the two driving members is ordinarily the flywheel, secured to and driven by the crankshaft of the engine. The other longitudinally displaceable member, which is ordinarily termed the pressure plate, is mounted on and is movable toward the first-named member, i. e., the flywheel, to engage between it and the flywheel what is termed the drive plate, which is the intermediate or driven member of the combination, this last-named plate being secured to the shaft extending either to the transmission or to the rear axle for the final drive.

In this type of clutch it is highly desirable to maintain the weight and spinning inertia of the driven plate, that is, the intermediate driven plate of the combination, as low as possible in order that at the time of reengagement the driving shaft turns faster than the drive. The slowing down of the driven shaft is therefore not to prevent slippage of the clutch at reengagement, but to facilitate gear shifting. It has not, however, been possible in clutches now in common use to secure this very desirable result and the driven plate has necessarily been of a size and weight which caused it to continue rotation at considerable speed for a considerable interval after disengagement. This is a particularly serious disadvantage in the case of clutches employed in such vehicles as heavy passenger cars, trucks and buses, and a disadvantage at least in clutches employed in even lighter vehicles.

In my improved clutch I have produced a design in which I have entirely eliminated thick, non-heat conductive materials, such as molded asbestos and the like, for the friction facings on the various members, have greatly reduced the weight of the driven plate and have transferred the friction facings or linings to the flywheel and pressure plate and have employed for such linings relatively highly heat-conducting materials, such as metallic compositions or metals having a considerable coefficient of friction, but still capable of relatively high heat conductivity. In this way I have made it possible to produce a clutch having an extremely simple and light drive plate which will have an extremely low spinning inertia, allowing this plate to come to rest quickly after disengagement, or at least to slow down in its rotative speed after disengagement.

To the accomplishment of the foregoing and related ends, said invention, then, consists of the means hereinafter fully described and particularly pointed out in the claims; the annexed drawing and the following description setting forth in detail certain structure embodying the invention, such disclosed structure constituting, however, but one of various structural forms in which the principle of the invention may be used.

Figure 3:
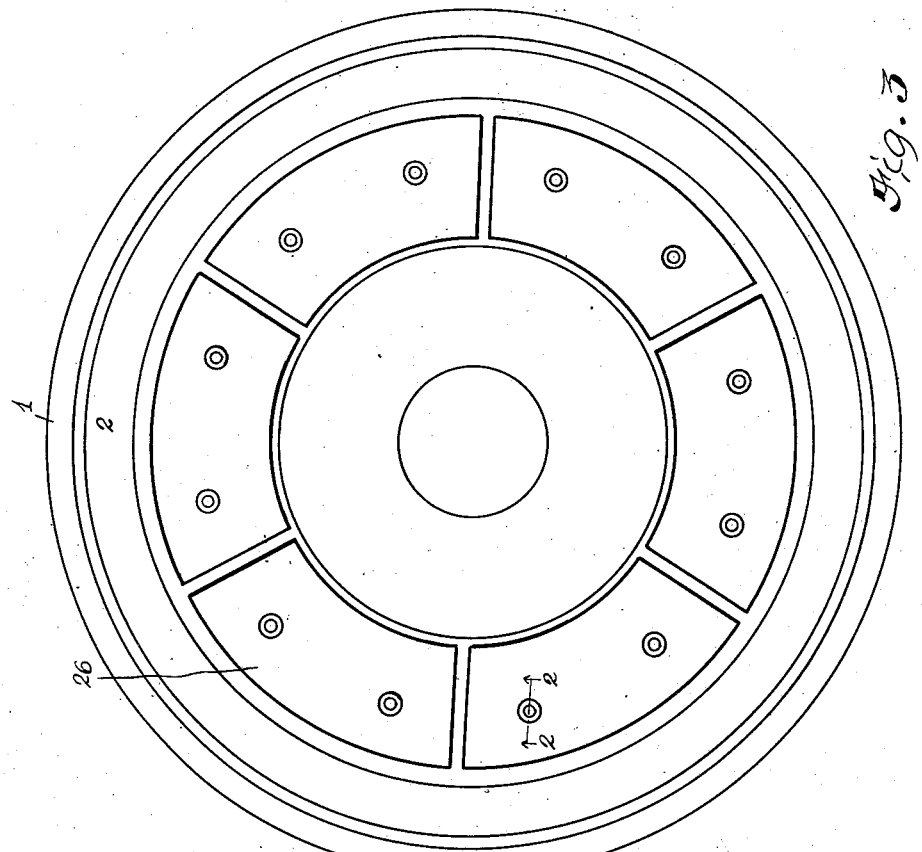
Fig. 3 is a front elevation or plan view of one of the driving elements, in this case the flywheel.
Figure 1:
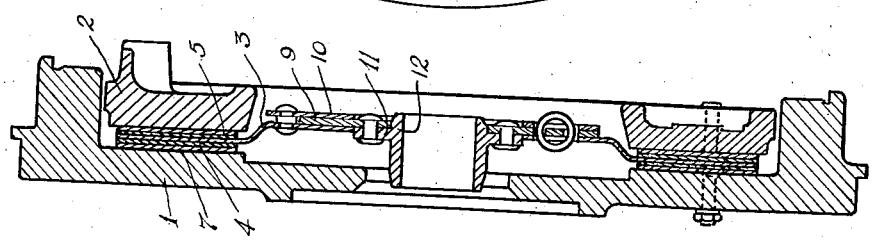
Fig. 1 is a transverse central section through one form of my improved clutch.
Figure 2:
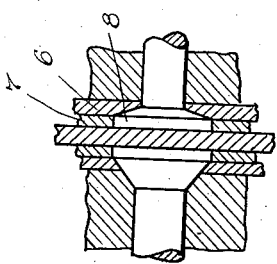
Fig. 2 is a partial transverse section upon an enlarged scale on the line 2—2, Fig. 3.

Referring now to Figs. 1 and 2 particularly, there is shown a clutch consisting of a driving element 1, which may be the flywheel already referred to, a second driving element 2, hereinafter termed the pressure plate, which is longitudinally movable toward and away from the element 1, and an intermediate driven member 3, hereinafter termed the driven plate, which is engaged between the members 1 and 2 for driving operation. The member 3 may be connected to the driving shaft in the transmission or the propeller shaft extending to the final drive of the vehicle as desired.

The driving elements 1 and 2 are provided with relatively smooth opposed annular surfaces 4 and 5, to which are secured segments 26 of a composite material consisting of a metal 6 capable of being integrally secured to the metal of which the members 1 and 2 are composed and a strip 7 of a metal having relatively high heat conductivity and a considerable coefficient of friction, such for example as a composition formed of powdered bronze, lead, graphite and an inert material, such as talc, compressed and sintered together in a temperature which will bond and fuse all of the particles into a coherent mass, or it may be formed of such a metal as copper-tin alloy, or a mixture of copper and lead or similar materials. The composite segments 26 may be secured to the elements 1 and 2 in any suitable manner, either by welding or by riveting in the manner shown in Fig. 2, in which rivets 8 extend through the outer facing metal 7 and then engage against the inner supporting metal 6, clamping the composite segment to the element 1 or 2 as the case may be. It will be understood that the two metal strips which together form the composite member are integrally secured together all over their contacting surfaces in any suitable manner.

Mounted between the longitudinally displaceable members 1 and 2 is the driven plate 3, which consists of a thin, light, strong disk of such a metal as pressed steel reinforced in the central portion by the other disks 9 and 10 riveted thereto, as indicated, and secured to a radially extending flange 11 on a hub member 12 constructed to engage over a shaft to be driven by the drive plate and upon which the drive plate is mounted concentric with the displaceable members 1 and 2. It will be understood of course that the driven plate 3 also is mounted for slight longitudinal displacement, permitting disengagement from the members 1 and 2 upon spacing of these two members from each other.

To engage the clutch, the members 1 and 2 are moved toward each other until the member 2 engages the drive plate 3 moving the latter longitudinally against the facing on the member 1 and thereafter clamping the driven plate 3 between the members 1 and 2 for driving engagement. During such engagement the members 1, 2 and 3 are of course locked together as a unit and have no relative movement, nor do they produce any heat or friction between the engaging faces thereof unless the driving pressure or the load resistance on the member 3 is sufficient to cause slippage, which in ordinary operation is not the case. During the initial engagement of the clutch slippage does occur, resulting in heat being generated in the central driven plate 3 and in the facings on the members 1 and 2. By reason of the relatively high heat conductivity of the facings 1 and 2, however, such heat as is generated by this initial slippage is rapidly carried away into the relatively large amounts of metal in the members 1 and 2 so that no high temperature is attained in any of these members and consequently there is no deterioration in any of these members by reason of heat. In cases where asbestos facings have been employed either on the flywheel and pressure plate or on the opposite faces of the driven plate, these faces acted as insulated coatings, preventing the conduction of heat away from the center plate and producing a relatively high temperature in the driven plate with consequent deterioration of the material therein and of the entire clutch.

In the present construction the driven plate is of extreme lightness and simplicity, and because of the light weight will tend to come to rest in a minimum time interval. In practice, the present clutch has been found extremely satisfactory in such severe service as in buses and trucks where other types of drive plate clutches have worn and burned out with great rapidity, while the simplicity of the present construction is such that the cost of the clutch can be reduced to a minimum.

I am aware that it has heretofore been attempted to construct a drive plate clutch of this general design in which molded asbestos facings have been used on the flywheel and pressure plate, and also one in which the drive plate has been employed with metallic frictional facings but in the first case the capacity of the clutch was much reduced because of the retarded heat flow and the consequent overheating of the clutch and in the latter case the drive plate was of very considerable weight and thickness and of high spinning inertia.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In mechanism of the character described, the combination of two coaxially mounted relatively axially movable driving elements provided with attached heat conducting metallic frictional facings on their opposed surfaces each of said facings forming a substantially continuous ring, and a driven element mounted coaxially with said driving elements and between the same, said driven element being axially movable into driving engagement with said driving elements upon axial displacement of the latter toward each other, and said driven element consisting of a thin resilient metallic plate, that directly engages said heat conducting metallic frictional facings.

2. In mechanism of the character described, the combination of a flywheel provided with an attached heat conducting, metallic frictional facing on one surface, a pressure plate non-rotatably mounted on said flywheel but axially movable with respect thereto, said plate having also an attached, metallic, frictional, heat conducting facing on the surface opposed to said flywheel, each of said facings forming a substantially continuous ring, and a thin flat steel driven plate mounted between said flywheel and pressure plate coaxial therewith for driving engagement on its opposite surfaces with the facings on said pressure plate and flywheel, said thin driven plate directly engaging said heat conducting metallic frictional facings.

JOHN V. O. PALM.